United States Patent [19]

Cebulak et al.

[11] 4,097,567
[45] Jun. 27, 1978

[54] TITANIUM DIBORIDE SHAPES

[75] Inventors: Walter S. Cebulak, New Kensington; John D. Weyand, Greensburg, both of Pa.

[73] Assignee: Aluminum Company of America, Pittsburgh, Pa.

[21] Appl. No.: 717,698

[22] Filed: Aug. 25, 1976

[51] Int. Cl.² .................. C04B 33/32; C04B 35/64
[52] U.S. Cl. ...................................... 264/65; 106/55; 106/73.3
[58] Field of Search .............. 264/65, 56; 106/55, 106/73.3

[56] References Cited

U.S. PATENT DOCUMENTS

| 3,003,885 | 10/1961 | Mandorf, Jr. | 106/73.3 |
| 3,215,545 | 11/1965 | Reidl et al. | 106/73.3 |
| 3,219,736 | 11/1965 | Stisser | 264/65 |
| 3,256,103 | 6/1916 | Roche, Jr. et al. | 106/55 |
| 3,291,622 | 12/1966 | Mandorf, Jr. et al. | 106/55 |
| 3,544,486 | 12/1970 | Passmore | 106/55 |
| 3,720,740 | 3/1973 | Muta et al. | 264/65 |
| 4,007,251 | 2/1977 | Jackson et al. | 106/73.3 |

*Primary Examiner*—Winston A. Douglas
*Assistant Examiner*—Mark Bell
*Attorney, Agent, or Firm*—Daniel A. Sullivan, Jr.

[57] ABSTRACT

The method including blending 90 parts by weight titanium diboride and 10 parts by weight boron nitride, cold isostatically pressing the blend to a shape at 60,000 pounds per square inch pressure, and sintering the shape at 1975° C in an inert atmosphere.

1 Claim, No Drawings

TITANIUM DIBORIDE SHAPES

BACKGROUND OF THE INVENTION

The present invention relates to a method of making titanium diboride ($TiB_2$) shapes containing boron nitride (BN), and more particularly to the manufacture of such shapes having the advantage that they stand up under the service conditions characteristic of the Hall-Heroult electrolysis for producing aluminum metal.

It is known to produce shapes of titanium diboride containing boron nitride. However, the known methods have the disadvantage that they use hot pressing, i.e. the bonding of the powder components requires application of pressure. Hot pressing adds considerably to the expense of the shapes, and it would be advantageous to be able to form shapes (serviceable in the Hall-Heroult process) using cold compressing, followed by sintering in the absence of pressing. By "cold" pressing, reference is to pressing carried out at room temperature.

SUMMARY OF THE INVENTION

It is an object of the present invention to provide a method for forming shapes of titanium diboride containing boron nitride, which method is characterized by cold pressing, followed by sintering.

This, as well as other objects which will become apparent in the discussion which follows, are achieved according to the present invention by the method including blending 90 parts by weight titanium diboride and 10 parts by weight boron nitride, cold isostatically pressing the blend to a shape at 60,000 pounds per square inch pressure, and sintering the shape at 1975° C in an inert atmosphere.

Shapes made by the method according to this invention may be used in the Hall-Heroult electrolytic process for producing aluminum. Detailed examples of use are set forth in the application of Perry A. Foster Jr., Ser. No. 645,533, filed Dec. 31, 1975 for "The Electrolytic Production of Metal" and that of Perry A. Foster Jr. et al., Ser. No. 645,534, filed Dec. 31, 1975 for "The Electrolytic Production of Metal".

DESCRIPTION OF THE PREFERRED EMBODIMENT 90 parts by weight of titanium diboride ($TiB_2$) powder (bought from Kawecki-Berylco Industries under the designation Chemical Grade Titanium Diboride) and 10 parts of boron nitride (BN) powder (bought from Union Carbide Corporation under the designation Boron Nitride Powder — HCP Grade) were blended in a double-cone blender for 30 minutes. The particle size distribution of the titanium diboride powder was as shown in Table 1.

Table 1.

| Particle Size Distribution of $TiB_2$ Powder | |
|---|---|
| Particle Diameter, in Microns | Weight-% of Material Below the Diameter |
| 44 | 100 |
| 30 | 99 |
| 20 | 95 |
| 15 | 91 |
| 10 | 84 |
| 8 | 76 |
| 6 | 64 |
| 5 | 50 |
| 4 | 34 |
| 3 | 20 |
| 2 | 10 |
| 1 | 5 |

It will be seen that the median particle size was 5 microns. The $TiB_2$ powder had the chemical analysis given in Table 2.

Table 2.

| Chemical Analysis of $TiB_2$ Powder | |
|---|---|
| Substance | Weight-% |
| O | 0.28 |
| C | 0.14 |
| N | 0.008 |
| Fe | 0.2 |
| $TiB_2$ | Remainder |

X-ray defraction analysis showed that the titanium and boron were present completely as titanium diboride. The boron nitride powder was 94.5 weight-% minus 325 mesh material having a tap density of 0.2 grams per cubic centimeter. It was at least 99 weight-% B plus N, with up to 0.5% O, up to 0.4% C, and up to 0.1% other metal impurities. The resulting blended powder was cold isostatically pressed to a pipe shape nominally 1.25 inches inner diameter by 2 inches outer diameter by 2.4 inches long at 60,000 pounds per square inch pressure, to approximately 70 percent of theoretical density. The pressing procedure was by the "wet bag" technique, using a rubber mold supplied by the Trexler Rubber Company, Ravenna, Ohio, the pressure being transmitted to the mold through a water medium. This pipe was sintered at 1975° C for one hour in argon to improve the integrity and conductivity of the pipe. Sintering resulted in slight densification (shown as shrinkage in Table 3) with substantial improvement in pipe integrity.

Table 3.

| Dimensions of $TiB_2$ - 10% BN Pipe Electrode | | | | |
|---|---|---|---|---|
| Condition | ID (in.) | OD (in.) | Length (in.) | Weight (grams) |
| Green | 1.28 | 2.03 | 2.37 | 225.1 |
| Sintered | 1.25 | 2.01 | 2.30 | 22.1 |

This pipe was installed in a laboratory smelting cell, protruding, with its axis in the vertical orientation, from the bottom of the cell, through the aluminum metal pad, and up into the electrolyte but spaced from the carbon anode, as more particularly shown in FIGS. 7 and 8 of the abovementioned patent applications of Foster and Foster et al. The bath composition used in the cell measured, in weight percent, 79% $Na_3AlF_6$, 12% $AlF_3$, 5% $CaF_2$, and 4% $Al_2O_3$, the bath ratio ($NaF/AlF_3$) being, on a weight basis, approximately 1.10. Operating temperatures were around 960° C, and anode current density was maintained at 6.5 amperes per square inch, i.e. 40 amperes electrical current flow through the cell.

The pipe survived 100 hours of operation, with analysis of the aluminum product revealing very little titanium present, probably no more than is expected from the contribution from the $Al_2O_3$ feed.

It will be understood that the above description of the present invention is susceptible to various modifications, changes, and adaptations and the same are intended to be comprehended within the meaning and range of equivalence of the appended claims.

What is claimed is:

1. The method comprising blending a mixture consisting of 90 parts by weight titanium diboride and 10 parts by weight boron nitride, cold isostatically pressing the blend to a shape at 60,000 pounds per square inch pressure, and sintering the shape at 1975° C in an inert atmosphere in the absence of pressure.

* * * * *

UNITED STATES PATENT AND TRADEMARK OFFICE
CERTIFICATE OF CORRECTION

PATENT NO. : 4,097,567
DATED : June 27, 1978
INVENTOR(S) : Walter S. Cebulak et al.

It is certified that error appears in the above-identified patent and that said Letters Patent are hereby corrected as shown below:

Col. 2, Table 3, under subheading "Weight", line 2      Change "22.1" to --221.6--.

Signed and Sealed this

Fifth Day of December 1978

[SEAL]

Attest:

RUTH C. MASON
Attesting Officer

DONALD W. BANNER
Commissioner of Patents and Trademarks